United States Patent [19]

Kellar et al.

[11] 4,297,118
[45] Oct. 27, 1981

[54] CONTROLLING OVERHEATING OF VACUUM MOLD USED TO SHAPE GLASS SHEETS

[75] Inventors: John D. Kellar, Pontypool; Gordon F. Pereman, Columbus, both of Canada

[73] Assignee: PPG Industries, Inc., Pittsburgh, Pa.

[21] Appl. No.: 131,337

[22] Filed: Mar. 18, 1980

[51] Int. Cl.³ .......................................... C03B 25/035
[52] U.S. Cl. ..................................... 65/104; 65/106; 65/107; 65/268; 65/273; 65/287; 65/291
[58] Field of Search ................ 65/107, 104, 268, 273, 65/287, 291, 106

[56] References Cited

U.S. PATENT DOCUMENTS

| | | | |
|---|---|---|---|
| 2,131,873 | 10/1938 | Goodwillie | 65/273 |
| 2,182,448 | 12/1939 | Paddock | 65/287 |
| 2,261,033 | 10/1941 | Marshall | 65/287 |
| 2,442,242 | 5/1948 | Lewis | 65/104 X |
| 2,570,309 | 10/1951 | Black | 65/285 X |
| 2,663,974 | 12/1953 | Thomson . | |
| 3,077,753 | 2/1963 | Dammers | 65/106 |
| 3,106,464 | 10/1963 | Dammers | 65/291 |
| 3,265,484 | 8/1966 | Ritter | 65/104 |
| 3,389,984 | 6/1968 | Englehart et al. | 65/287 |
| 3,459,521 | 8/1969 | Nedelec | 65/106 X |
| 3,607,187 | 9/1971 | McMaster | 65/287 X |
| 3,846,104 | 11/1974 | Seymour | 65/104 |
| 4,092,141 | 5/1978 | Frank et al. | 65/114 |
| 4,202,681 | 5/1980 | McMaster et al. | 65/104 |
| 4,204,853 | 5/1980 | Seymour | 65/106 |
| 4,204,854 | 5/1980 | McMaster et al. | 65/106 |

*Primary Examiner*—Arthur D. Kellogg
*Attorney, Agent, or Firm*—Donald Carl Lepiane; Edward I. Mates

[57] ABSTRACT

Glass sheets are shaped while heat-softened by engaging a surface thereof against an apertured surface of a vacuum mold within a heating furnace. After releasing the glass sheet for further processing, the vacuum mold is removed from the furnace without the glass sheet for cooling and returned to the furnace in sufficient time to engage the next glass sheet to be shaped. This invention avoids the need to overheat the glass to compensate for cooling that occurs when a mold engages a glass sheet outside a furnace to shape the latter without losing control of the maximum temperature to which the mold is subjected during a glass sheet shaping program.

10 Claims, 23 Drawing Figures

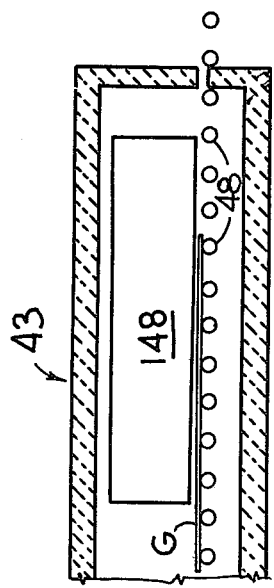
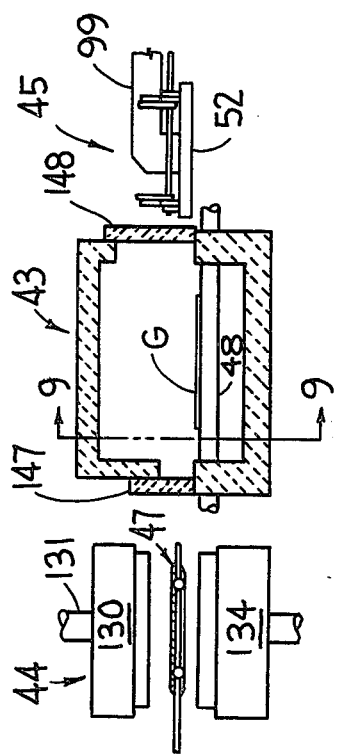
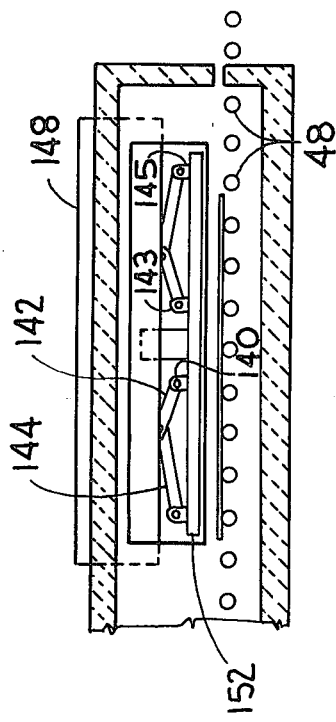
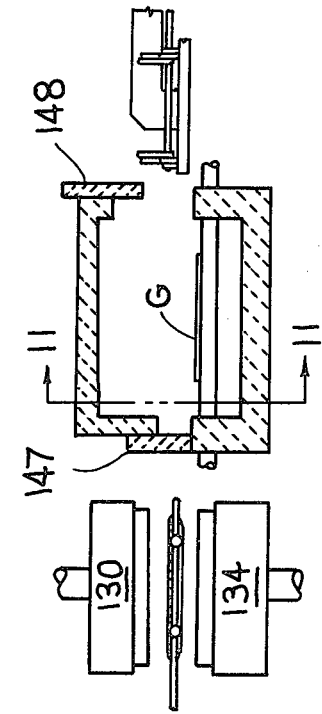
FIG. 8
FIG. 9
FIG. 10
FIG. 11

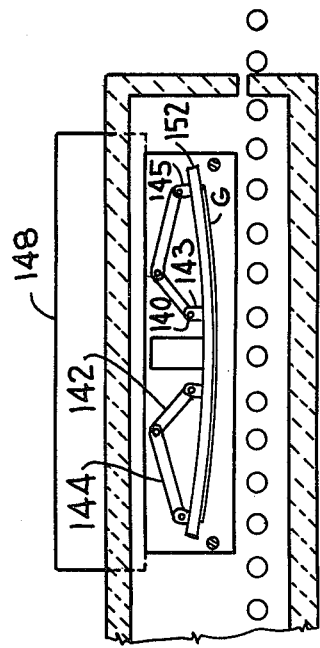
FIG. 17
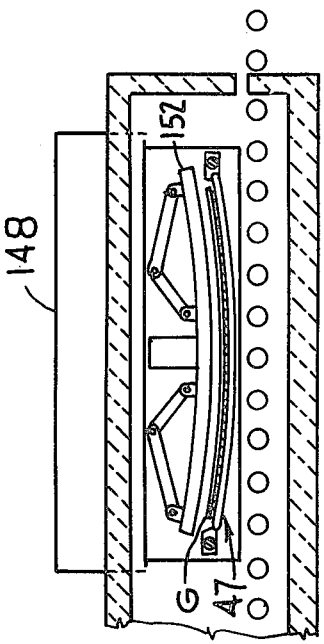
FIG. 19
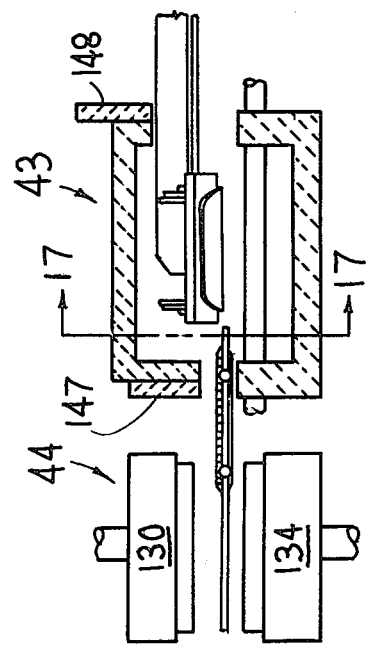
FIG. 16
FIG. 18

CONTROLLING OVERHEATING OF VACUUM MOLD USED TO SHAPE GLASS SHEETS

BACKGROUND OF THE INVENTION

1. Field of the Invention

This invention relates to shaping and cooling glass sheets and particularly to the high speed production of bent glass sheets that are toughened by air quenching, and most particularly, for shaping and heat treating relatively thin glass sheets, particularly those having a nominal thickness of ⅛ inch (3.2 mm) or less. Thinner glass sheets sag more readily than thicker glass sheets at any given elevated temperature above the glass deformation temperature. Hence, it is more difficult to control the shape imparted to thinner glass sheets.

Shaped and tempered glass sheets are widely used as side windows or rear windows in vehicles such as automobiles or the like and, to be suitable for such application, flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects that would tend to interfere with the clear viewing therethrough in their viewing area.

During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of said path into a shaping station where each glass sheet in turn is transferred onto a vacuum mold. The vacuum mold lifts and holds the heat-softened glass sheet by suction. At about the same time, a transfer and tempering ring having an outline shape conforming to that desired for the glass sheet slightly inboard of its perimeter moves upstream into a position below the vacuum mold. Release of the vacuum deposits the glass sheet onto the tempering ring. The tempering ring supports the peripheral portion of the glass sheet while it conveys the glass sheet into a cooling station for rapid cooling.

In prior art apparatus, the vacuum mold was either provided with a lower, rigidly curved shaping surface that shaped the heat-softened glass sheet incrementally by suction thereagainst or had a smoothly surfaced flat shaping surface that lifted the flat glass sheet by suction thereagainst and depended on a release of the vacuum within the mold to permit the hot glass sheet to drop by gravity or by a combination of gravity and an additional force onto the tempering ring to develop the shape dictated by the outline configuration of the tempering ring. Such processes as the latter have been called drop forming.

When a rigid, curved surface is adjacent a heat-softened flat glass sheet during the application of suction through said surface, much power is need to obtain the suction necessary to lift and shape a hot glass sheet simultaneously by suction at a rate sufficiently rapid to provide a high speed mass production operation for shaping and tempering glass sheets. When a flat glass sheet is shaped by drop forming, the maximum depth of bend obtainable depends on the glass thickness, glass temperature and distance the glass is dropped. It is difficult to control the shape of thin glass sheets, particularly those heated to excessive temperature. Furthermore, if the drop distance is increased to make possible a deeper bend, more time is needed to lift the glass sheet the longer drop distance, thereby limiting the maximum rate at which bent and tempered glass sheets can be produced.

2. Description of Patents of Interest

U.S. Pat. No. 2,131,873 to Goodwillie shapes one or a pair of glass sheets by sag bending to conform to the upwardly facing concave shaping surface of a solid mold of continuous extent and lowering an upper solid mold of complementary convex shape against the sagged glass sheet within a heating furnace to mechanically press the glass into a more accurate bend. The glass is shown supported throughout its entire surface on the lower mold from the time it sags to conform to the lower mold through the pressing step and during the time the bent glass sheet is removed from the hot atmosphere of the furnace. Such prolonged engagement can produce optical defects in the vision area of the bent glass.

U.S. Pat. No. 2,442,242 to Lewis heats flat glass sheets having a straight leading edge while supported on flat strips until the leading edge engages a straight rib. A pair of heated molds of complementary shape sandwich the hot glass to impress a cylindrical shape thereon in an enclosed bending chamber that forms an extension of a heating chamber. This patent locates the molds in a high temperature atmosphere continuously.

U.S. Pat. No. 2,570,309 to Black sag bends a glass sheet by heating it within a heating furnace while supported on an outline ring-type mold to conform to the mold by gravity sagging and then lifts the gravity sagged sheet on a lower solid pressing mold of concave elevation into pressing engagement against an upper solid pressing mold of complementary shape to complete the spherical bend after conveying the sag-bent glass sheet beyond the heating furnace. The spherically bent sheet is returned to the outline ring-type mold for support with chilling blasts of air to temper the bent sheet.

U.S. Pat. No. 2,663,974 to Robert W. Thomson bends heat softened glass sheets between flexible strips of metal that are weighted and a pair of rigid glass sheet support members that have upper edge surfaces curved convexly in elevation to conform to the shape desired for a rectangular glass sheet after it has been shaped. The weighted strips bear down on the upper surface of the glass sheet to distort the latter to conform to the convexly curved upper edge surfaces. No vacuum or transfer device is included in this apparatus.

U.S. Pat. No. 3,077,753 to August Dammers discloses a press bending mold in which a vertically suspended, heat softened glass sheet is press bent against a rigid, convexly curved, forming dye by pressing a resilient sheet of fabric that is spring loaded to apply pressure against the surface of the glass sheet opposite the surface that faces the rigid die of convex configuration. No transfer to a second shaping member and no vacuum operation is included in this patented construction.

U.S. Pat. No. 3,106,464 to August Dammers moves a rigid die of convex configuration against one surface of a heat softened glass sheet while the opposite surface is forced against a flexible frame to shape the glass sheet and the frame. The frame is then shaped still further at its ends by pistons that engage the opposite ends of the frame against the ends of the convex die. There is no vacuum used in the bending method of this patent.

U.S. Pat. No. 3,265,284 to George F. Ritter Jr. discloses a flexible belt that is located between an upper pressing mold of convex configuration and a lower mold of concave configuration. The lower mold is lifted to bring a heat softened glass sheet carried by the flexible belt into engagement against the downwardly facing surface of the upper mold. When the lower mold retracts, the belt moves the shaped glass sheet onto a roller conveyor that transports the glass through a quenching area where it is cooled. The lack of peripheral support for the glass sheet causes a loss of shape control so that the ultimate shape of the glass sheet after it is cooled can not be controlled from the shape imparted at the press bending station where the glass sheet supported on the flexible belt is sandwiched in pressurized engagement between the upper and lower molds.

U.S. Pat. No. 3,389,984 to Oscar D. Englehart and James S. Shuster is similar to the aforementioned Ritter patent in providing a flexible ribbon of material superimposed over the shaping surface of a pressing mold of concave configuration to provide a run between said concave mold and one surface of a heat softened glass sheet to be press bent. In this patent, the glass sheet is suspended from tongs. The other surface of the glass sheet faces a press bending mold of convex configuration. Relative movement of the molds toward one another presses a shape onto the glass sheet. The glass sheet is then supported solely by tongs for transfer into a cooling area where stresses are imparted to the glass depending upon the rate of cooling. Lack of peripheral support and lack of a vacuum support characterize this press bending operation.

U.S. Pat. No. 3,459,521 to Nedelec supports a flat glass sheet on a hammock while the glass sheet in a heat softened state is pressed between upper and lower molds of complementary configuration. The glass sheet is somehow removed from the hammock and quenched.

U.S. Pat. No. 3,607,187 to Harold A. McMaster lifts a soft, flat glass sheet by lowering a vacuum mold toward said sheet and applying suction through a downwardly facing, permanently curved, shaping surface of a vacuum mold to shape the sheet by suction thereagainst. Much power is needed to provide the suction necessary to shape the entire flat glass sheet to conform to the permanently curved shape of the vacuum mold in incremental portions, particularly those portions most widely spaced from the vacuum mold when other portions are initially engaged by the vacuum mold. This method, if useful at all, is only practical for producing extremely shallow bends and is too time consuming for high speed production. This patent also moves the vacuum mold horizontally over a conveyor belt from a shaping station beyond an enclosed heating furnace to a cooling station. The mold engages the glass sheet by vacuum during its transfer to the cooling station and then releases the vacuum to redeposit the glass sheet without peripheral support onto the conveyor belt. Lack of peripheral support may result in the glass sheet losing its desired shape.

U.S. Pat. No. 3,846,104 to Samuel L. Seymour provides method and apparatus in which glass sheets are conveyed through a furnace on conveyor means, and heated while passing through the furnace to a temperature approaching the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum mold at the shaping station and transfer it to the cooling station. Therefore, each glass sheet must be lifted in its entirety to an elevated position a minimum vertical distance for transfer to said vacuum mold, a time consuming step.

U.S. Pat. No. 4,092,141 to Robert G. Frank and De-Witt W. Lampman provides similar apparatus with vertically movable sheet transfer means for rapidly removing from the tempering ring each bent glass sheet after its surfaces harden sufficiently to permit it to be conveyed on an additional downstream conveyor. The latter provides a glass sheet supporting surface at an elevation slightly higher than the level at which the glass sheet is supported by the transfer and tempering ring. However, the apparatus of this prior art patent also provides for lifting each glass sheet toward the upper vacuum mold a substantial vertical distance since the vacuum mold remains in an elevated position between successive shaping operations to await the arrival of a subsequent glass sheet at the shaping station.

The invention of U.S. patent application Ser. No. 960,403 of Samuel L. Seymour, filed Nov. 13, 1978, for Glass Sheet Alignment Means and Method of Using now U.S. Pat. No. 4,204,853, discloses a glass sheet shaping and tempering method in which each glass sheet, upon leaving a heating furnace, is elevated by means of a flat vacuum platen which is brought into contact with the upper surface of the heat-softened, flat glass sheet. After the vacuum platen and the glass sheet rise to an elevated position, a shaping and tempering ring is conveyed into a position beneath the glass sheet, the vacuum is released, and the glass sheet drops onto the shaping and tempering ring to effect the bending by the drop forming process. The shaping and tempering ring is then retracted from beneath the vacuum platen and passed into a tempering station where blasts of air are directed onto the opposite surfaces of the drop formed glass sheet to temper the glass. While this arrangement provides a flat surface for the vacuum mold that is easier to smooth than a curved surface, and simplifies change-over from one shape to another since the bending and tempering ring is the only major element of the shaping and tempering apparatus which must be reconstructed or replaced to produce different configurations, drop forming has limitations. For example, the depth of bend that can be accomplished thereby without losing control over the overall shape of the treated glass sheet is limited.

Prior to the present invention, the glass sheet bending art lacked a glass sheet shaping and tempering technique that comprised a vacuum mold having a glass engaging surface as smooth as that of flat vacuum molds of the prior art, and that also shaped the glass sheet to a shape approximately its final desired shape within a heating furnace before releasing the glass sheet onto a shaping and tempering ring to make it possible to increase the speed of a mass production operation for shaping and tempering glass sheets, particularly those thinner than 3.2 mm nominal thickness. Shaping thin glass sheets within a heating furnace saves energy because it avoids the need to overheat the glass, which cools rapidly en route to a shaping station outside the furnace.

However, it is difficult to control the shape and temperature of vacuum molds permanently installed within a furnace. It is also difficult to obtain access to repair or provide routine maintenance for a mold that is permanently installed within a furnace.

SUMMARY OF THE PRESENT INVENTION

The present invention provides a glass sheet shaping method using apparatus that comprises an upper vacuum mold that first engages and lifts a heat-softened glass sheet by suction, and that provides clearance for a shaping and tempering ring to enter the shaping station. The glass sheet shaping station of the present invention is located within the heating furnace. The vacuum mold that is used to engage and lift a heat-softened glass sheet by suction is moved outside the furnace between successive bending operations. Such movement cools the vacuum mold intermittently. Such intermittent cooling helps to control the temperature rise and consequently the shape of the vacuum mold.

While the present invention is described in terms of apparatus that comprises a deformable vacuum mold capable of assuming a flat configuration suitable for engaging a flat glass sheet by suction and deforming into a curved configuration, it is understood that the present invention may be used to shape a glass sheet within a furnace using a glass sheet shaping mold of any permanent configuration that engages the glass sheet while hot within a heating furnace and transfers the glass sheet onto a ring or ring-like member for transfer to a cooling station, and temporarily leaves the hot furnace after transferring the glass sheet onto said ring or ring-like member for a short period of time to avoid developing an excessively high temperature and returns to within the heating furnace in time to process the next glass sheet to be shaped.

The present invention will be better understood in the light of a description of preferred illustrative embodiments that follows, which description includes the accompanying drawings wherein like reference numbers refer to like structural elements.

BRIEF DESCRIPTION OF THE DRAWINGS

FIG. 8 is a schematic, sectional view of the shaping station of the FIG. 7 embodiment at the beginning of a sheet shaping cycle when a flat glass sheet enters a glass shaping station and both a vacuum mold and a ring-like member are outside the shaping station;

FIG. 9 is a sectional view taken along the line 9—9 of FIG. 8;

FIG. 10 is a view of the shaping station similar to that of FIG. 8 taken shortly after FIG. 8, showing the vacuum mold preparing to enter the shaping station from its mold retraction station to one side of said shaping station as the glass sheet nears its destination at the shaping station;

FIG. 11 is a sectional view taken along the line 11—11 of FIG. 10;

FIG. 16 is a view of the shaping station similar to that of FIG. 8 taken shortly after FIG. 14, showing the ring-like member entering the shaping station as the vacuum mold continues to lift and shape the glass sheet;

FIG. 17 is a sectional view taken along the line 17—17 of FIG. 16;

FIG. 18 is a view of the shaping station similar to that of FIG. 8 taken shortly after FIG. 16, showing the ring-like member aligned under the vacuum mold at the moment vacuum is released to drop the glass sheet onto the shaping and tempering ring;

FIG. 19 is a sectional view taken along the line 19—19 of FIG. 18;

DESCRIPTION OF THE PREFERRED EMBODIMENTS

Figure 1:
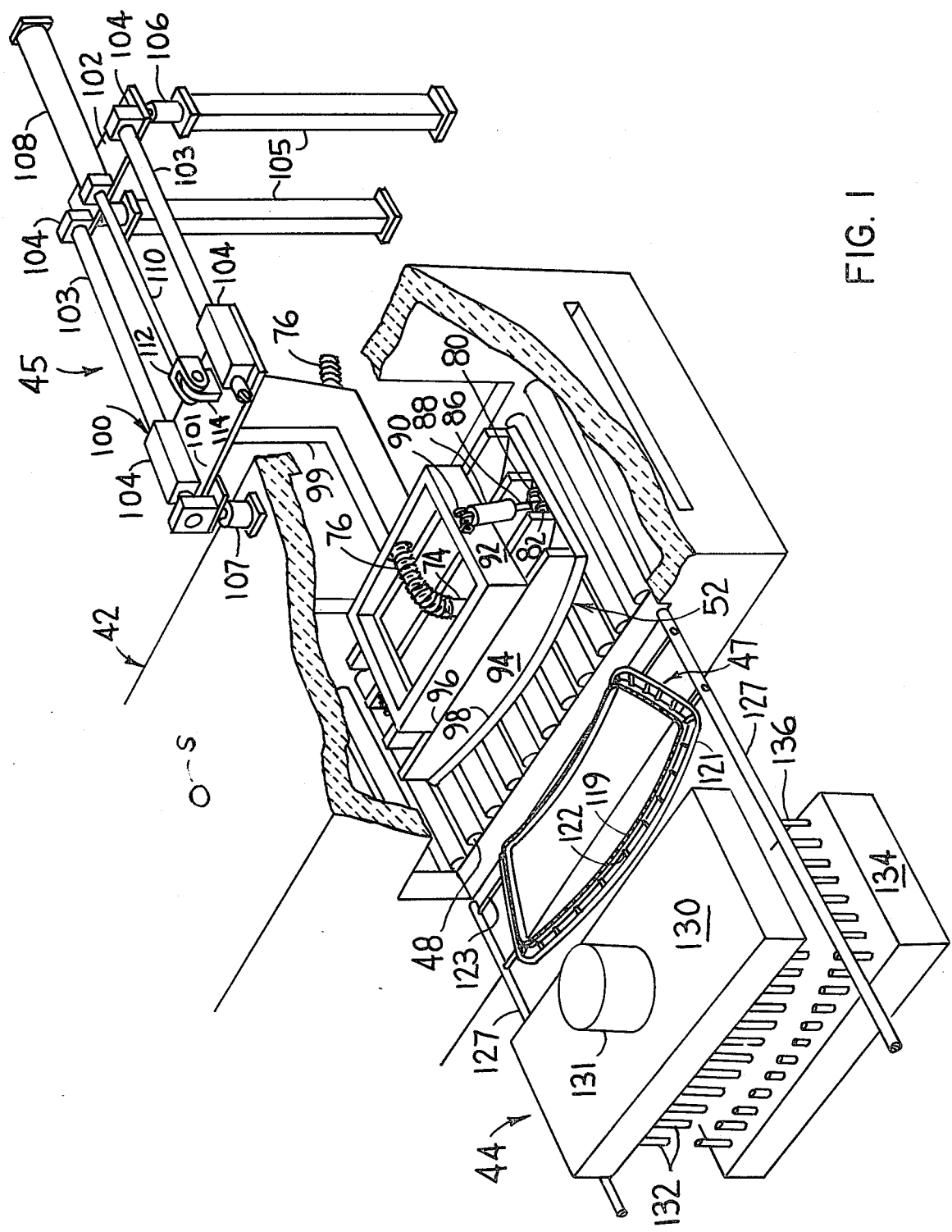
FIG. 1 is a fragmentary, perspective view of apparatus for shaping and tempering glass sheets incorporating a preferred embodiment of the present invention comprising a shaping station located within a roller hearth furnace, with certain parts omitted for clarity.

Referring now to FIG. 1 of the drawings, an apparatus for heating and shaping sheets of material, such as glass, includes a heating means including a furnace 42 (the exit end of which is shown). The furnace includes a shaping station 43 to which sheets of glass are conveyed from a loading station (not shown) after being heated to the glass deformation temperature. A cooling station generally indicated at 44 for cooling the curved sheets of glass and an unloading station (not shown) beyond the cooling station 44 are located in end-to-end relation along a transverse path to one side of the shaping station 43. A mold retraction station 45 is located to the other side of the shaping station 43 and to the side opposite the cooling station 44. A sheet transfer means 47 shown at the shaping station 43 transfers the glass sheet to the cooling station 44.

Heat may be supplied in the furnace 42 by hot gases from gas burners or by electrical radiant heaters or by a combination of both, which heat supply means are well known in the art. The furnace side walls support bearing housings for a horizontal conveyor comprising longitudinally spaced, transversely extending conveyor rolls 48 that define a path of travel which extends through the furnace 42. Additional conveyor rolls 48 are located at the shaping station 43 to form a continuation of the path of travel through the furnace 42. The rolls of the conveyor are arranged in sections and their rotational speed controlled through clutches (not shown) so that the speed of the different conveyor sections may be controlled and synchronized in a manner well known in the art. A glass sensing element S is located a short distance upstream of the shaping station 43 to initiate a cycle of operation of this apparatus.

Limit switches or electronic controllers may be provided to synchronize the operation of various elements of the apparatus according to a predetermined sequence. Since their arrangement and manner of operation are not part of this invention, they will not be described in detail herein.

The shaping station 43 comprises a deformable upper mold structure 50. The latter is composed of a deformable metal box 52 covered with a blanket of refractory material such as fiber glass (not shown).

The deformable metal box 52 comprises a flexible, apertured, lower metal sheet 54 having perforations 55 distributed throughout, and an upper metal sheet 56 that is also flexible but has a single central aperture 57 therethrough. Upper and lower flexible sheets 54 and 56 are of half hard tempered sheet steel, and are of rectangular outline. The longitudinal side edges of the flexible metal sheets 54 and 56 are spaced along their length by a pair of rectangular laminated springs 58. The latter are ¾ inch (19 millimeters) on edge. The rectangular laminated springs 58 are secured by screws 60 that extend through slotted apertures 62 extending vertically through the rectangular laminated springs 58 and slotted openings 64 in the lower flexible metal sheet 54 and are received in apertures 66 spaced about the perimeter of the upper metal sheet 56.

Additional short laminated springs 69 extend parallel to the rectangular laminated springs 58 and form longitudinal rows approximately one inch (2.5 centimeters) apart. The short laminated springs 69 are spaced longitudinally with transverse spaces 71 extending across their width dimension. In a particular embodiment of this invention, the spaces 71 are of dimensions such as to assure uniform distribution of positive or negative air pressure to the deformable metal box 52 according to the criteria to be described later.

A pair of transverse hollow metal bars 72 in the form of square members ¾ inch (19 millimeters) wide on each side interconnect the opposite end edge portions of the lower flexible metal sheet 54 and the upper flexible metal sheet 56 by additional screws 60 which are secured in place through vertical holes 73 in the upper and lower walls of the hollow bars 72 and additional screw-receiving holes 66 in the ends of upper sheet 56.

The upper sheet 56 has a central aperture to receive a vacuum pipe 74. The latter communicates with a vacuum exhaust duct 76, which in turn, communicates with a vacuum source (not shown).

A pair of longitudinally spaced brackets 80 is attached to the upper surface of the upper flexible metal sheet 56 near each end thereof. The bracket is apertured to receive a cross-pin 82. The cross-pin is received in a piston head 84. The latter is attached to the bottom of a piston rod 86 which is actuated for movement within a piston housing 88. The latter is pivotally mounted at its upper end to a piston support 90 carried by one of an outer pair of transverse channel irons 92.

Figure 2:
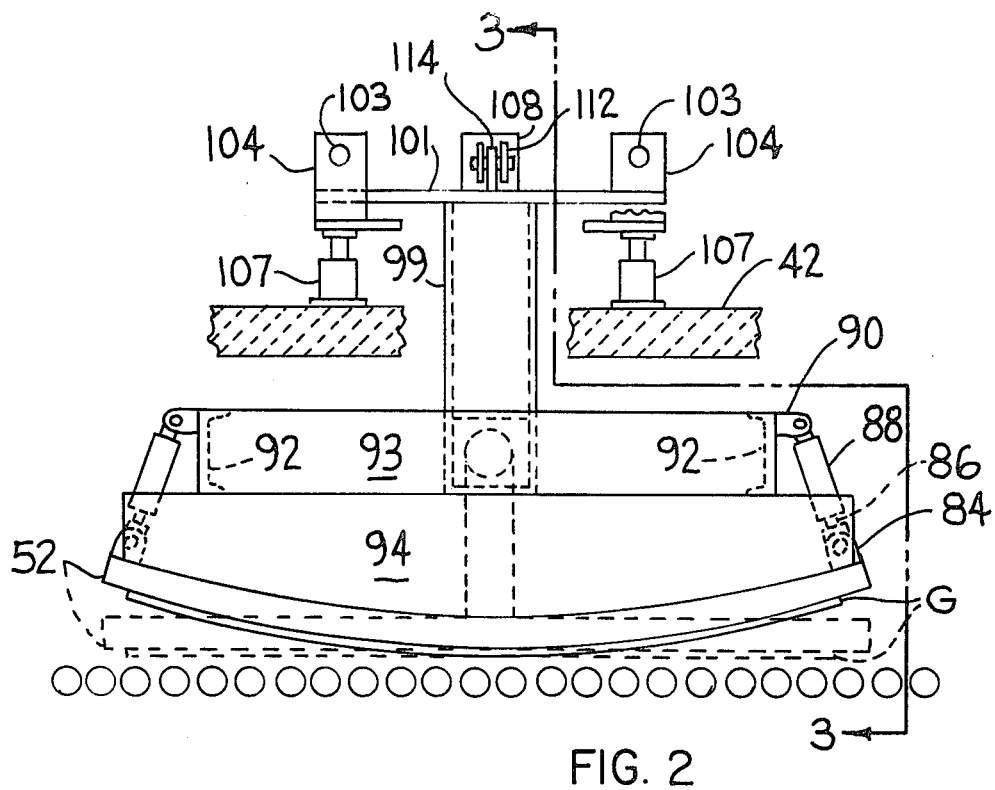
FIG. 2 is an elevational side view of the apparatus of FIG. 1 with parts omitted to show a simplified illustration of the structure of a deformable vacuum shaping mold included in the preferred embodiment in full lines in its glass shaping configuration and showing in phantom its configuration while flat to engage a flat glass sheet.
Figure 3:
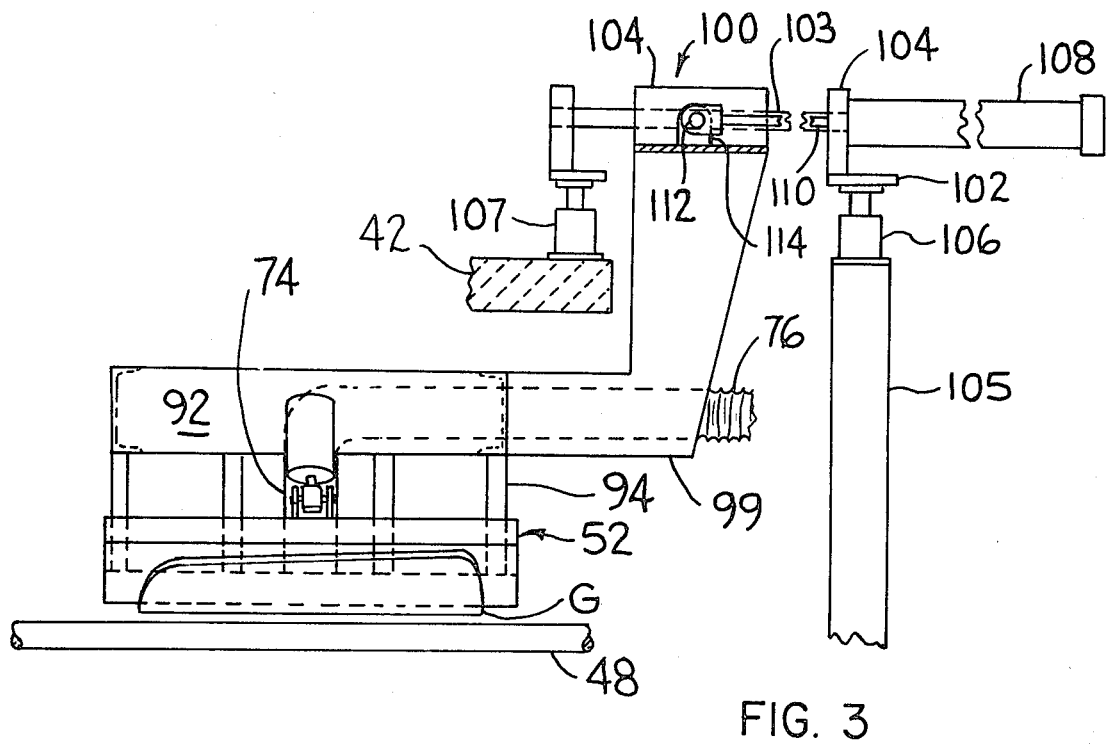
FIG. 3 is a sectional view along the line 3—3 of FIG. 2 with certain parts omitted or broken away to show other parts of the apparatus more clearly.
Figure 4:
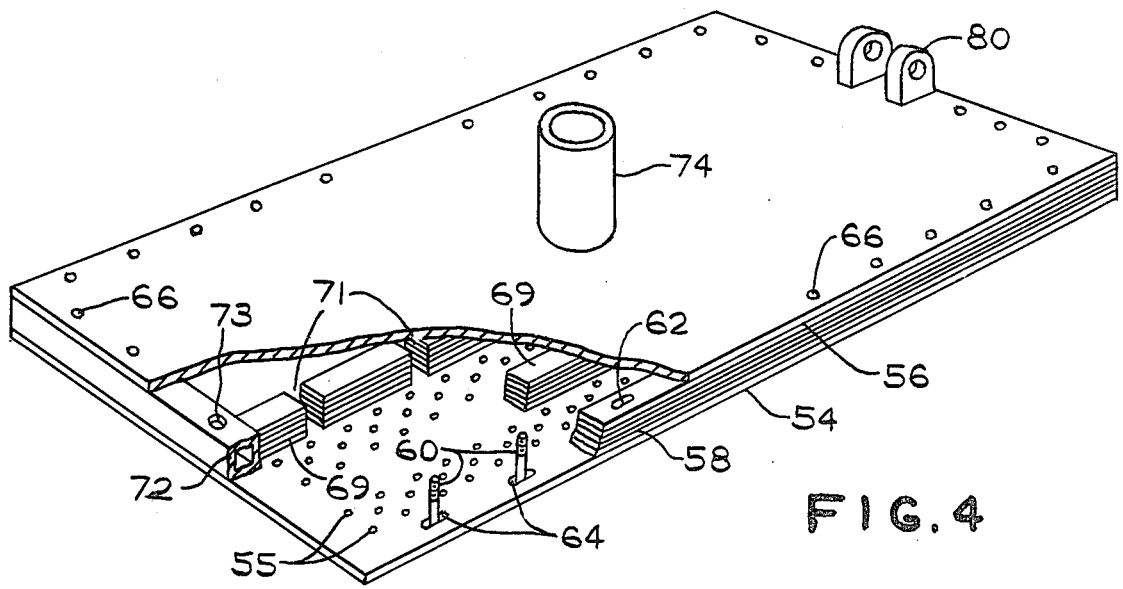
FIG. 4 is a fragmentary, perspective view of the deformable vacuum mold with parts removed to show other parts more clearly.
Figure 5:
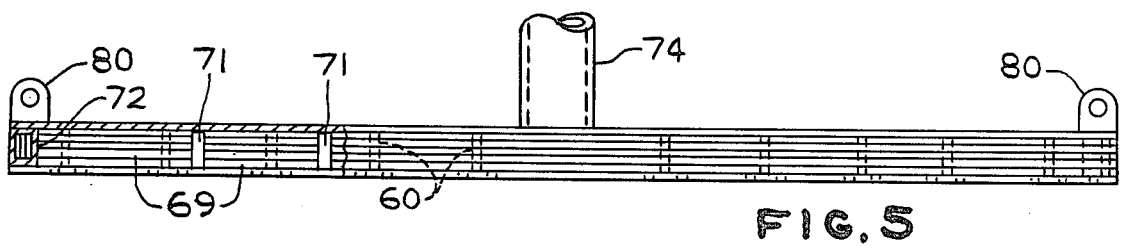
FIG. 5 is a longitudinal sectional view of the deformable vacuum mold of FIG. 4, showing its deformable shaping surface in its flat configuration to lift and shape a flat glass sheet; and with certain parts omitted to show certain interior structural elements.
Figure 6:
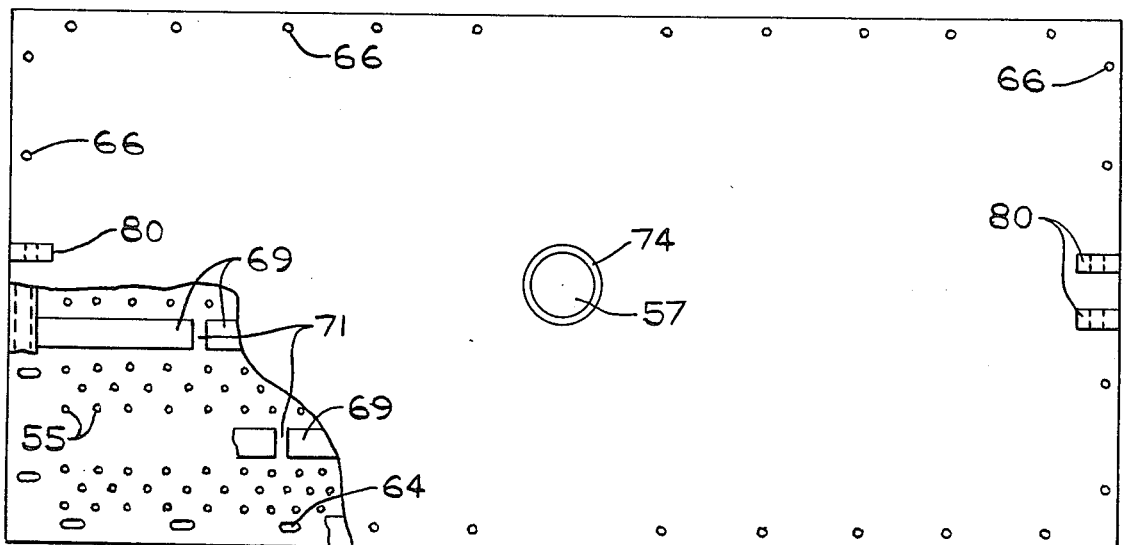
FIG. 6 is a fragmentary plan view of the vacuum mold of FIGS. 4 and 5, with certain parts omitted to show certain interior structural elements more clearly.

The transverse channel irons 92 run lengthwise parallel to one another and transverse to the length of the deformable metal box 52. Longitudinal channel irons 93 interconnect channel irons 92 to form a horizontal frame. The channel irons 92 are attached in spaced relation along their length to the upper edge surfaces of longitudinal beams 94, four of which are shown in FIG. 2. Each of the longitudinal beams 94 has a straight upper edge 96 and a curved lower edge 98 (see FIG. 2).

The pistons 88 are mounted intermediate the two centrally disposed longitudinal beams 94. When the piston rods 86 of the pistons 88 are extended, the deformable metal box 52 assumes the position depicted in phantom in FIG. 2 with the lower flexible metal sheet providing a flat surface. Since the lower flexible metal sheet is perforated, when suction is applied through the vacuum duct 76 and vacuum pipe 74 to the deformable metal box 52, a flat glass sheet G having arrived on the conveyor rolls 48 below the deformable metal box 52 is sucked into engagement against the lower flexible metal sheet 54 by vacuum. When the piston rods 86 of pistons 88 are simultaneously retracted in an upward direction, the deformable metal box 52 deforms so that the upper flexible metal sheet 56 bears upward against the curved lower edge 98 of the longitudinal beams 94, thereby distorting the deformable metal box 52 to conform to the shape of the curved lower edge 98 of the longitudinal beams 94. The glass sheet G, being heat softened, and being sucked into engagement against the lower flexible metal sheet 54, assumes the shape of the lower sheet.

The frame formed by channel irons 92 and 93 is connected to an L-shaped reinforcement 99. The latter is connected to a carriage 100, which is thus fixed for vertical movement with the deformable vacuum mold 50 which includes the deformable metal box 52 in whatever shape it is forced to assume by the positions of the piston rods 86 and the piston housing 88. In order to provide the vertical adjustable feature for positioning the deformable vacuum mold 50, the carriage has a front support beam 101, a rear support beam 102, a pair of slide bars 103, and a pair of slide bar housings 104 supported on each support beam.

Each rear support beam 102 is supported on a vertical post 105. The posts 105 support unique vertical pistons 106, which act in unison with a pair of front vertical pistons 107 mounted on the roof of the furnace 42 at shaping station 43 to raise or lower the front and rear support beams 101 and 102 and their supported slide bar housings 104. Such actuation raises or lowers the deformable metal box 52 in the shaping station 43.

A horizontal piston 108 is connected through a piston rod 110 and a piston head 112 to a lug 114 fixed to front support beam 101. Actuation of the horizontal piston 108 moves the deformable metal box 52 between the shaping station 43 and the mold retraction station 45.

The sheet transfer means 47 comprises a ring-like member 119 conforming in elevation and plan outline to the shape desired immediately inward of the peripheral edge of a glass sheet to be shaped at the shaping station 46. The ring-like member 119 is surrounded by a pipe type reinforcement 121. The ring-like member has an upper edge surface that is notched or serrated to minimize contact with the glass and preferably is constructed in the manner of U.S. Pat. No. 3,973,943 to Samuel L. Seymour. Connectors 122 are provided around the periphery to interconnect the ring-like member 119 and the reinforcement 121. Extension arms 123 extend outward from the opposite longitudinal ends of the outline formed by the sheet transfer means 47 and terminate in connections to cantilevered rods 127 which are actuated for movement in unison by motor drive means (not shown) to move the ring-like member 119 from shaping station 43 through cooling station 44 to an unloading station (not shown) and a return to the shaping station 43.

The cooling station 44 comprises an upper plenum 130 connected to an air supply duct 131 which delivers air under pressure from a source of tempering medium (not shown) to said upper plenum 130 for delivery through downwardly directed pipe nozzles 132 toward the upper surface of a glass sheet supported on said member 119. Additional tempering medium supply means communicates with a lower plenum 134 which is provided with upwardly directed nozzles 136 for supplying the tempering medium such as pressurized air against the lower surface of a glass sheet supported on said ring-like member 119.

Figure 7:
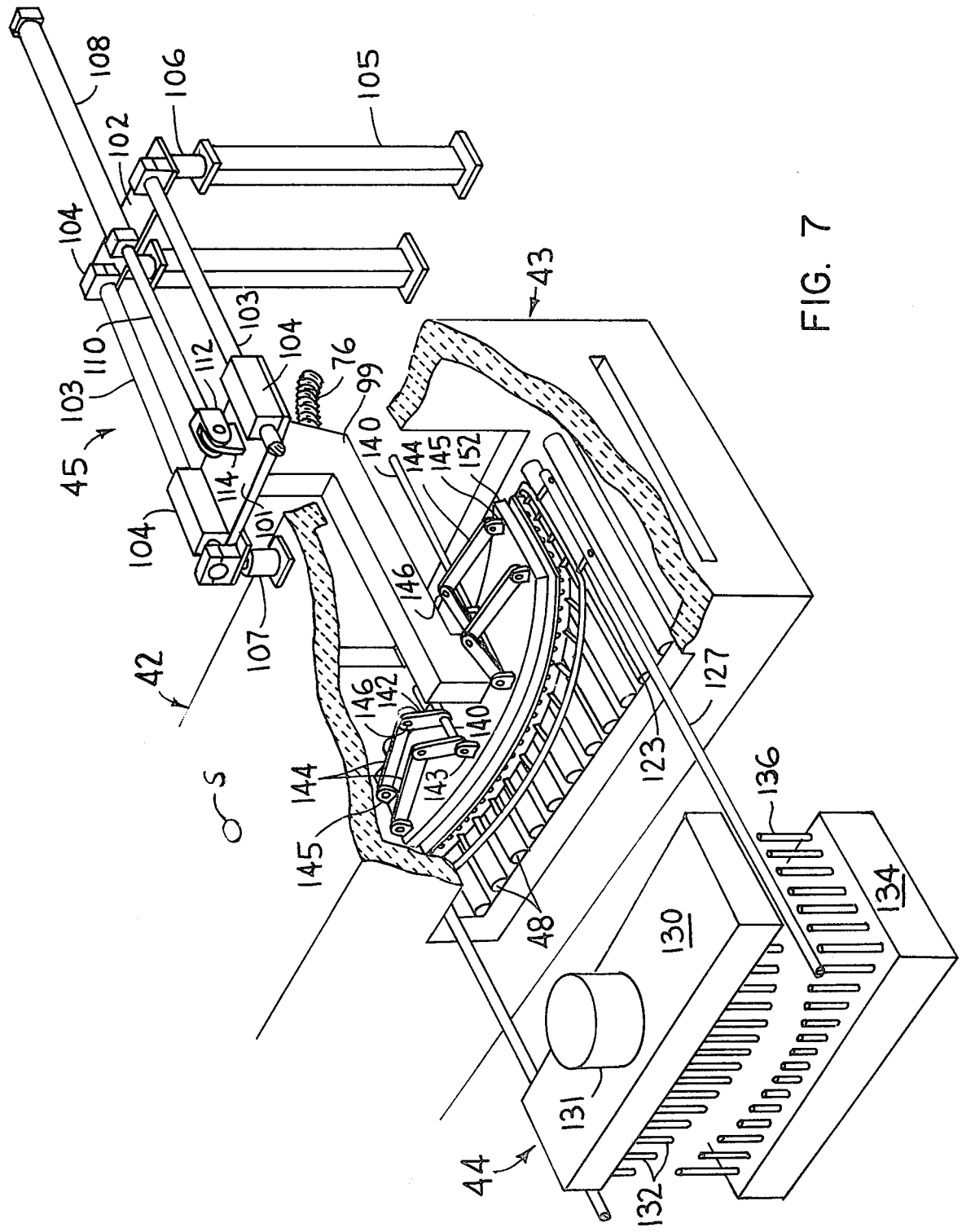
FIG. 7 is a view similar to FIG. 1 of an alternative embodiment of glass sheet shaping apparatus comprising a deformable vacuum mold.

The embodiment of FIGS. 1 to 6 is a little bulky to insert and remove from the furnace 42. A more streamlined embodiment of deformable vacuum mold 152 is shown in FIG. 7. This embodiment is similar to that of FIG. 1, but omits the pistons 88, the longitudinal beams 94 and the reinforcing frame formed by the channel members 92 and 93 and includes a pair of actuating rods 140, each fixed for rotation with inner links 142 of two pairs of links on each longitudinal side of the L-shaped reinforcement 99. Inner links 142 are pivotally mounted at their inner ends to pivots 143 fixed to the upper surface of the upper sheet of the deformable metal box 152, while outer links 144 are pivotally mounted at their outer ends to pivots 145, also fixed to said upper surface. A common pivot 146 pivotally connects each inner link 142 with a corresponding outer link 144. The pivots 143 and 145 are spaced from one another a distance such that the corresponding links 142 and 144 extend at a more obtuse angle when the deformable vacuum mold 152 defines a flat configuration and at a more acute angle relative to one another to distort the deformable vacuum mold 152 into a convexly curved configuration.

As seen schematically in FIGS. 8, 10, etc., the shaping station 43 is provided with a side door 147 on the side facing the cooling station 44 and another side door 148 on the side facing the mold retraction station 45. These side doors are opened only when needed for the passage of the sheet transfer means 47 through side door 147 and the deformable metal box 52 or 152 through side door 148 so as to minimize loss of furnace heat between successive shaping operations.

CYCLE OF OPERATION

A plurality of glass sheets are conveyed through the furnace 42 while supported on rotating furnace conveyor rolls 48. When a glass sheet is sensed by the sensing means S, the apparatus elements of the FIG. 7 embodiment are in the positions depicted in FIGS. 8 and 9 ready to begin a shaping cycle.

FIGS. 8 and 9 show the shaping station 43 of the FIG. 7 embodiment at the beginning of a sheet shaping cycle with doors 147 and 148 closed when a flat glass sheet enters the glass shaping station 43 and both the deformable box 152 and the ring-like member 119 are outside the shaping station. The box is the mold retraction station 45 and the member 119 is on the opposite side of the shaping station 43.

FIGS. 10 and 11 show the door 148 opening and the vacuum mold preparing to enter the shaping station from its mold retraction station 45 to one side of said shaping station as the glass sheet nears its destination at the shaping station. These figures depict the second stage of the shaping cycle.

Figure 12:
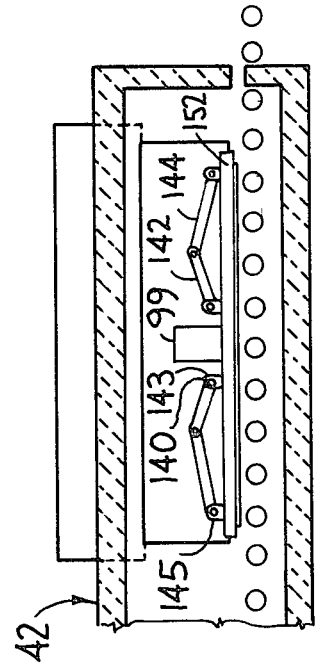
FIG. 12 is a view of the shaping station similar to that of FIG. 8 taken shortly after FIG. 10, showing the vacuum mold and the glass sheet in alignment at the shaping station.
Figure 13:
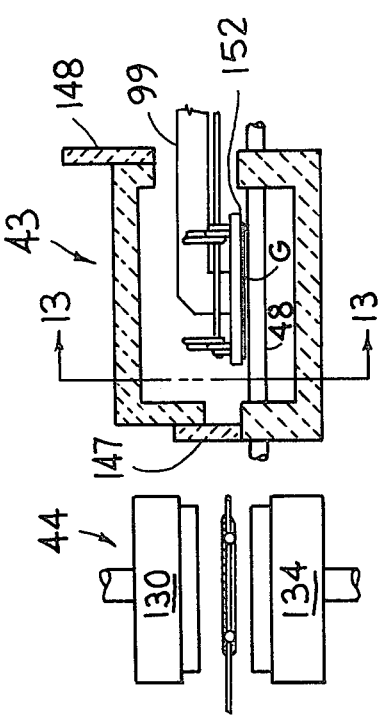
FIG. 13 is a sectional view taken along the line 13—13 of FIG. 12.

The glass sheet G continues to travel along the conveyor rolls 48 and the horizontal piston rod 108 extends to urge the vacuum mold to enter the shaping station 43 until the vacuum mold is in vertical alignment over the glass sheet at the shaping station as shown in FIGS. 12 and 13. The deformable box 152 is in its flat configuration and vacuum has been started to lift the hot, flat glass sheet into engagement against the deformable box 152 when the latter is flat.

Figure 14:
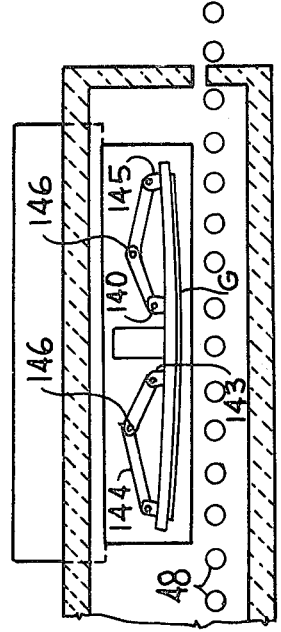
FIG. 14 is a view similar to that of FIG. 8 taken shortly after FIG. 12, when the vacuum mold is beginning to lift and shape the glass sheet while the ring-like member begins to move from is parking position toward the shaping station.
Figure 15:
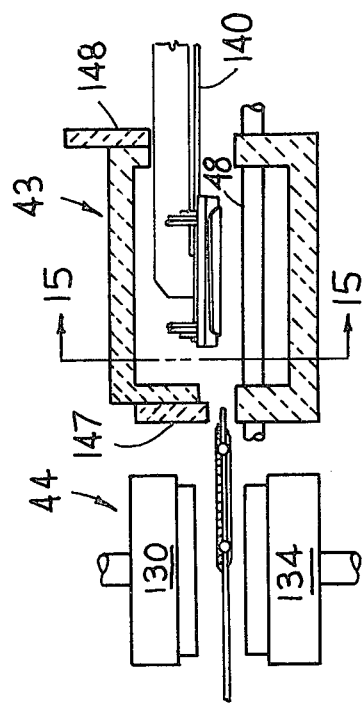
FIG. 15 is a sectional view taken along the line 15—15 of FIG. 14.

As soon as the flat glass sheet G engages the box 152, pistons 106 and 107 extend upward in unison to cause the vacuum mold to lift the glass sheet. At the same time, the door 147 opens to permit the ring-like member 119 to move into the shaping station and actuating rods 140 rotate to cause the metal box to deform upwardly at its longitudinal end portions. Vacuum continues to be applied to the deforming box 152 so that the glass sheet G continues to engage said box as it is lifted and shaped into the condition shown in FIGS. 14 and 15.

Door 147 opens completely to allow the sheet transfer means 47 including said ring-like member 119 to enter the shaping station 43 as the vacuum mold continues to lift and shape the glass sheet. FIGS. 16 and 17 show the sheet transfer means 47 entering the shaping station.

The pistons 106 and 107 continue to lift the vacuum mold and its deformable box 152 and the actuating rods 140 continue to rotate until the ring-like member reaches a position in the shaping station 43 under the vacuum mold. At that moment, vacuum is released to drop the glass sheet onto the ring-like member. FIGS. 18 and 19 show how the shaped glass sheet is deposited onto the ring-like member when vacuum stops.

Figure 21:
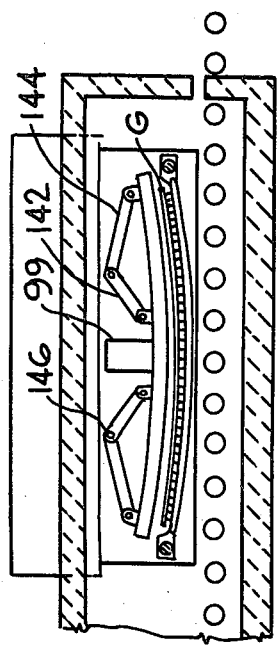
FIG. 21 is a sectional view taken along the line 21—21 of FIG. 20.
Figure 20:
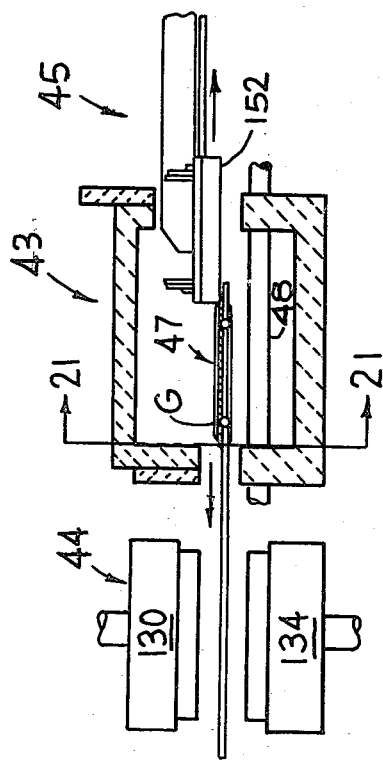
FIG. 20 is a view of the shaping station similar to that of FIG. 8 taken shortly after FIG. 18, showing the vacuum mold relieved of said glass sheet leaving the shaping station in one direction toward its mold retraction station as the ring-like member moves in a direction opposite said one direction with the glass sheet supported thereon for transfer into a cooling station.

The empty vacuum mold and its deformable metal box 152 is removed in one direction toward the mold retraction station 45 by retraction of piston rod 110 while the actuating rods 140 rotate to spread the links 142 and 144 to cause the deformable box 152 to resume its flat configuration as the sheet transfer means 47 moves in a direction opposite said one direction with the glass sheet supported on its ring-like member 119 for transfer into cooling station 44. FIGS. 20 and 21 show this stage of the shaping cycle.

Figure 23:
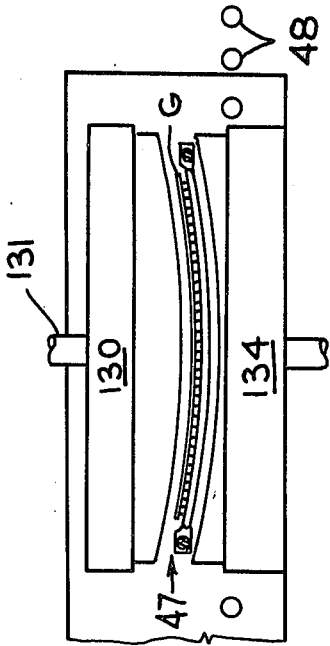
FIG. 23 is a sectional view taken along the line 23—23 of FIG. 22.
Figure 22:
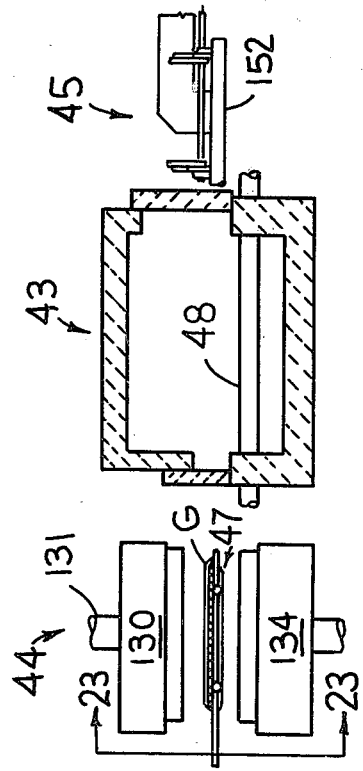
FIG. 22 is a view of the shaping station similar to that of FIG. 8 and taken shortly after FIG. 20, showing the vacuum mold resting at its mold retraction station, said ring-like member supporting said glass sheet between upper and lower sets of nozzles in the cooling station and the doors at the opposite walls of the furnace closed as the shaping station awaits the arrival of a succeeding glass sheet that is conveyed through the furnace toward said shaping station.

When the transfer means 47 clears the shaping station 43, door 147 closes. Similarly, door 148 closes when the deformable metal box 152 and its associated reinforcing and actuating structure clears the shaping station. FIGS. 22 and 23, taken shortly after FIGS. 20 and 21 show the vacuum mold resting at mold retraction station 45, said ring-like member 119 supporting said glass sheet between upper and lower plenum chambers 130 and 134 provided with sets of nozzles in the cooling station and the doors 147 and 148 at the opposite walls of the furnace closed as the shaping station awaits the arrival of a succeeding glass sheet that is conveyed through the furnace toward said shaping station.

The apparatus is ready for another cycle of operation.

Various alternative embodiments may be used in the practice of the present invention. For example, any available energy source such as electricity, gas, oil, coal, etc. may be used to heat the glass sheets within the furnace. Any type of conveyor, such as a gas hearth type of conveyor or a conveyor that uses rolls in conjunction with a fluid that compensates for part of the mass of glass rotatably supported on the rolls of a roller conveyor may be substituted for the roller conveyor system for delivering glass sheets to the shaping station. Furthermore, the deformable vacuum mold of the illustrated embodiment that moves vertically may be replaced by a deformable vacuum mold that maintains a fixed position relative to vertically movable conveyor rolls and the ring-like member may be made of spaced rail sections to provide clearance to lower said rolls and drop a glass sheet from the deformable vacuum box onto the ring-like member and provide clearance for the ring-like member to transfer the glass sheet to the cooling station and to return empty to the shaping station before the vertically movable rolls rise to their glass sheet receiving position in time for the arrival of the next glass sheet to be shaped.

In another embodiment contemplated, the deformable vacuum mold may move horizontally instead of vertically from a first mold position above the additional conveyor rolls to a second mold position above the rail-like member and change its configuration during its horizontal movement.

The cooling station may use liquids or other fluids instead of air as the cooling medium and may use slot type nozzles or bar type nozzles instead of or in combination with the pipe-type nozzles shown.

Other variations within the gist of the present invention included the substitution of flexible, laminated metal springs instead of the hollow metal bars 72 to connect the longitudinal ends of the flexible metal plates 54 and 56 to one another or to provide a single, continuous, laminated spring extending around the entire perimeter of the deformable metal box 52 or 152. The latter variations permit the metal box to be deformed about its longitudinal axis as well as about its transverse axis to produce more complex shapes. In addition, the vacuum moly may be sectionalized to comprise a plurality of two or more vacuum mold sections in the form of vacuum boxes pivoted to one another to accommodate to one or more sharply bent end regions of the glass sheet to be bent, regardless of whether the vacuum boxes comprising the vacuum mold sections are rigid or deformable. The invention is also suitable for shaping glass sheets to asymmetrical shapes were the glass sheet is bent adjacent either one or more side edges and/or one or more end edges regardless of whether the vacuum mold is a unitary mold comprising a single deformable metal box as in the embodiments of FIGS. 1 and 7 or a sectionalized vacuum mold.

It is also understood that while the embodiments described previously relate to shaping and tempering glass sheets, the present invention can be used to shape glass sheets that are to be annealed subsequently. In such a case, the cooling station 44 is replaced by an annealing lehr section wherein the bent glass is cooled at a controlled rate after its shaping.

The form of the invention shown and described in this disclosure represents an illustrative preferred embodiment and certain modifications thereof. It is understood that various additional changes may be made without departing from the gist of the invention as defined in the claimed subject matter which follows.

We claim:

1. A method of shaping a glass sheet, comprising the steps of:
    supporting a heated sheet on support means in a shaping chamber having a heated interior, the sheet heated to approximately its shaping temperature;
    transferring the heated sheet in the shaping chamber to shaping means to remove the sheet from the support means;
    shaping the sheet in the shaping chamber by way of the shaping means;
    transferring the shaped sheet from the shaping means to transfer means, said transferring step practiced in the shaping chamber;
    advancing the shaped sheet on the transfer means out of the shaping chamber;
    cooling the shaped sheet;
    removing the shaping means out of the shaping chamber into an environment cooler than the heated interior of the shaping chamber to permit cooling of the shaping means; and
    practicing said removing step before practicing said transferring the heated sheet step, shaping step and transferring the shaped sheet step for next subsequent heated sheet on the support means in the shaping chamber.

2. The method as in claim 1 wherein the transfer means is a ring-like member and further including the step of conveying the sheet supported on the member through a cooling station for exposing the supported shaped glass sheet to tempering medium applied at a rate sufficient to impart at least a partial temper to the shaped glass sheet.

3. The method as in claim 1 or 2, wherein the shaping means includes a deformable mold and both the mold and the hot glass sheet are flat during the practice of said transferring the heated sheet step, and the hot glass sheet is held against the deformable mold while the mold deforms into a curved configuration to shape the sheet during said shaping step.

4. An apparatus for shaping a glass sheet, comprising:
elongated heating means to heat a glass sheet to approximately its shaping temperature, said means including a heated shaping chamber;
first advancing means to advance a sheet from said heating means to said shaping chamber;
means for shaping a sheet;
means for moving said shaping means into and out of said heated shaping chamber;
second advancing means to advance a shaped sheet out of said heated shaping chamber;
first transferring means to transfer a sheet from said first advancing means to said shaping means;
second transferring means to transfer a sheet from said shaping means to said second advancing means;
means responsive to the movement of a said first advancing means for actuating in succession said shaping means, said first transferring means and said second transferring means to move a sheet from said first advancing means to said shaping means, to shape a sheet and to transfer a sheet from said shaping means to said second transferring means;
means for actuating said moving means to move said shaping means out of the shaping chamber after the shaped sheet is transferred to said second advancing means; and
means for activating said second advancing means to move said second advancing means out of said shaping chamber.

5. The apparatus as set forth in claim 4 wherein said second advancing means is a ring-like member.

6. The apparatus as set forth in claim 5 where said shaping means is deformable.

7. Apparatus for bending glass sheets comprising:
a furnace;
a shaping station within said furnace;
conveyor means for conveying glass sheets through said furnace into said shaping station;
a vacuum mold deformable between a flat configuration and a shaped configuration;
a mold retraction station to one side of said shaping station;
means for moving said vacuum mold between said mold retraction station and said shaping station;
glass sheet transfer means;
a cooling station to the other side of said shaping station;
means for moving said glass sheet transfer means between said cooling station and a position beneath said vacuum mold at said shaping station, whereby said vacuum mold enters said shaping station, engages and lifts said glass sheet arriving at said shaping station at a temperature sufficiently hot for deformation while engaged by said vacuum mold, said ring-like member enters said shaping station below said vacuum mold, said vacuum mold releases said glass sheet onto said ring-like member and moves into said mold retraction station while said ring-like member removes said glass sheet from said shaping station to said cooling station;
means operatively connected to said vacuum mold to change its configuration between said flat configuration and said shaped configuration whereby said vacuum mold is formed into said flat configuration for initially engaging said hot glass sheet while the latter is hot and is deformed into said shaped configuration while it continues to engage and lift said hot glass sheet to impart said shaped configuration onto said glass sheet prior to releasing said glass sheet onto said ring-like member.

8. The method as set forth in claim 1 wherein the transfer means is a second transfer means and the support means is a first transfer means and said supporting steps is practiced by:
heating the sheet to approximately its shaping temperature; and
advancing the heated sheet on the first transfer means into the shaping chamber having the interior heated to a temperature sufficient for the shaping of the sheet; and
said step of transferring the heated sheet from the support means to the shaping mold is accomplished by:
engaging the heated sheet in the shaping chamber by way of the shaping mold to remove the sheet from the support means.

9. The method as set forth in claim 8 wherein the first transfer means moves along a movement path into the shaping chamber, said removing step includes moving the shaping mold in a first direction along a reciprocating path transverse to the movement path and said advancing step is practiced by moving the second transfer means in a second direction opposite to the first direction along the reciprocating path.

10. The method as set forth in claim 9 wherein said practicing step is practiced by moving the shaping mold in the second direction along the reciprocating path into the shaping chamber and the second transfer means in the first direction along the reciprocating path.

* * * * *